(12) United States Patent
Atherton et al.

(10) Patent No.: US 10,049,074 B2
(45) Date of Patent: Aug. 14, 2018

(54) PCI-E REAL-TIME FLOW CONTROL OPTIMIZATION

(71) Applicant: LENOVO Enterprise Solutions (Singapore) PTE. LTD., New Tech Park (SG)

(72) Inventors: William E. Atherton, Hillsborough, NC (US); Dustin Patterson, Durham, NC (US); Sandra Rhodes, Wake Forest, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 286 days.

(21) Appl. No.: 14/835,088

(22) Filed: Aug. 25, 2015

(65) Prior Publication Data
US 2017/0060807 A1   Mar. 2, 2017

(51) Int. Cl.
| | |
|---|---|
| *G06F 8/41* | (2018.01) |
| *G06F 13/42* | (2006.01) |
| *G06F 13/40* | (2006.01) |
| *G06F 13/374* | (2006.01) |

(52) U.S. Cl.
CPC ........ *G06F 13/4282* (2013.01); *G06F 13/374* (2013.01); *G06F 13/4068* (2013.01)

(58) Field of Classification Search
CPC .............................. H04W 28/10; G06F 8/433
See application file for complete search history.

(56) References Cited

U.S. PATENT DOCUMENTS

| | | | | |
|---|---|---|---|---|
| 6,084,856 A | * | 7/2000 | Simmons | H04L 49/90 370/235 |
| 6,199,133 B1 | * | 3/2001 | Schnell | H04L 41/24 709/208 |
| 7,430,622 B1 | * | 9/2008 | Owen | G06F 13/374 710/29 |
| 2004/0210782 A1 | * | 10/2004 | Hsu | G06F 11/348 713/300 |

(Continued)

OTHER PUBLICATIONS

Leo Frishberg,"Use the Bird's Eye View to Debug PCIe Flow Control", Tektronix, www.tek.com, Dec. 12, 2011, http://www.ecnmag.com/articles/2011/12/use-birds-eye-view-debug-pcie-flow-control.

(Continued)

*Primary Examiner* — Farley Abad
(74) *Attorney, Agent, or Firm* — Kunzler, PC

(57) ABSTRACT

For optimizing expansion devices on a computer expansion bus based on real-time flow control data, a system, apparatus, method, and computer program product are disclosed. The apparatus includes a configuration module that initializes a plurality of expansion bus registers, each expansion bus register associated with one of the plurality of expansion bus slots, a packet module that monitors flow control packets on the expansion bus, a flow control module that calculates flow control data from the flow control packets, the flow control data relating to the plurality of expansion devices, and a register module that writes flow control data to the plurality of expansion bus registers. The apparatus may further includes an optimization module that calculates an arrangement of the plurality of expansion devices, based on the flow control data, to maximize expansion bus throughput.

20 Claims, 7 Drawing Sheets

(56) References Cited

U.S. PATENT DOCUMENTS

2007/0106860 A1* 5/2007 Foster, Sr. ............ G06F 1/3225
711/170
2014/0108697 A1* 4/2014 Wagh .................. G06F 13/4027
710/313

OTHER PUBLICATIONS

Leo Frishberg, "Hunting PCIE Flow Control Bugs with Gun and Camera", Tektronix, May 2011, http://www.tek.com/document/whitepaper/pci-express-power-state-management-validation-and-debug-using-tektronix-logic-pr.
http://itlaw.wikia.com/wiki/Scratchpad_register, "Scratchpad Register", The IT Law Wiki, WIKIA, Last visited Aug. 24, 2015.

* cited by examiner

PCI-E REAL-TIME FLOW CONTROL OPTIMIZATION

FIELD

The subject matter disclosed herein relates to computer expansion buses and more particularly relates to optimizing expansion devices on a computer expansion bus based on real-time flow control data.

BACKGROUND

Description of the Related Art

Expansion busses allow for added functionality of a computer system. Data transfer on an expansion bus is governed, in part, by flow control, such as data transfer based on available flow control credits. However, a user cannot easily determine whether the computer system is in an optimized configuration which can result in computer systems where the flow control and credits are not optimized for the computer system.

BRIEF SUMMARY

An apparatus for optimizing expansion devices on a computer expansion bus based on real-time flow control data is disclosed. A method and computer program product also perform the functions of the apparatus.

The apparatus includes a configuration module that initializes a plurality of expansion bus registers. Each expansion bus register is associated with one of the plurality of expansion bus slots. The apparatus includes a packet module that monitors flow control packets on the expansion bus, and a flow control module that calculates flow control data from the flow control packets. The flow control data relates to the plurality of expansion devices. The apparatus includes a register module that writes flow control data to the plurality of expansion bus registers.

In some embodiments, the apparatus further includes an optimization module that calculates an arrangement of the plurality of expansion devices to maximize expansion bus throughput. The arrangement is calculated based on the flow control data. The apparatus may include a relocation module that prompts a user to relocate at least one of the plurality of expansion devices into a different expansion bus slot. The apparatus may include a reset module that deletes data values stored in the plurality of expansion bus registers in response to the at least one expansion device being relocated. The register module writes new flow control data to the plurality of expansion bus registers based on the relocated expansion device in response to the at least one expansion device being relocated.

In certain embodiments, the optimization module includes a slot limit module that identifies flow control limits for each of the plurality of expansion bus slots. The optimization module includes a candidate module that compares, for each of the plurality of expansion bus slots, an average flow control usage for an expansion device using the expansion bus slot to an identified flow control limit for the expansion bus slot. The flow control data includes average flow control usage for each of the plurality of expansion devices. The candidate module selects at least one candidate expansion device from the plurality of expansion devices based on the comparison. The optimization module includes a placement module that assigns each candidate expansion device to one of the plurality of expansion bus slots based on the average flow control usage and the flow control limits.

In some embodiments, the apparatus includes a priority module that ranks the at least one candidate expansion device based on highest average flow control usage. The apparatus may include a compatibility module that compares a physical size of an expansion device to a size supported by an expansion bus slot. The placement module assigns each candidate expansion device to one of the plurality of expansion bus slots based on the size comparison.

In certain embodiments, the configuration module includes an allocation module that identifies an unused expansion bus register for each expansion bus slot and allocates the identified expansion bus registers for storing flow control data. The configuration module also includes a reset module that deletes data values stored in the allocated expansion bus registers. In some embodiments, the plurality of expansion bus registers further includes a plurality of extended capability registers for a peripheral component interconnect express (PCIe) expansion bus. Each extended capability register stores flow control data of one of plurality of expansion bus slots.

In some embodiments, the flow control data includes average flow control usage for each expansion device, a ratio of average flow control usage to flow control limit for each expansion device, and/or an average amount of unused flow control credits for each expansion device. In certain embodiments, the register module further updates the flow control data stored to the plurality of expansion bus registers in response to the flow control module calculating additional flow control data.

The method includes initializing a plurality of expansion bus registers. Each expansion bus register is associated with one of a plurality of expansion bus slots. The method includes monitoring for flow control packets on an expansion bus. The method includes extracting flow control data from the flow control packets. The method includes the flow control data relating to a plurality of expansion devices operating on the expansion bus. The method includes writing flow control data to the plurality of expansion bus registers based on the flow control packets.

In some embodiments, the method includes calculating an arrangement of the plurality of expansion devices that optimizes throughput based on the flow control data. Each of the plurality of expansion devices is coupled to one of the plurality of expansion bus slot. In certain embodiments, the method includes prompting a user to relocate at least one of the plurality of expansion devices into a different expansion bus slot based on the calculated arrangement. The method may include determining that the at least one expansion device is relocated. The method may include resetting the plurality of expansion bus registers storing flow control data. The method may include writing new flow control data to the plurality of expansion bus registers based on the relocated expansion device.

In some embodiments, optimizing throughput of the plurality of expansion devices based on the flow control data includes identifying flow control limits for each of the plurality of expansion bus slots. Optimizing throughput includes, for each of the plurality of expansion bus slots, comparing an average flow control usage for an expansion device using the expansion bus slot to an identified flow control limit for the expansion bus slot. The flow control data includes average flow control usage for each of the plurality of expansion devices.

The method may also include determining at least one candidate expansion device from the plurality of expansion devices based on the comparison. The method may include assigning each candidate expansion device to one of the plurality of expansion bus slots based on the average flow control usage and the flow control limits. In certain embodiments, the method also includes assigning a priority to each candidate expansion device based on average flow control usage. The candidate expansion device having the highest average flow control usage is assigned a highest priority. Assigning each candidate expansion device to one of the plurality of expansion bus slots is further based on the priority of each candidate expansion device.

In some embodiments, assigning a candidate expansion device to one of the plurality of expansion bus slots includes selecting a candidate expansion device having the highest average flow control usage. The selected candidate expansion device is coupled to an incumbent expansion bus slot. Assigning the candidate expansion device to one of the plurality of expansion bus slots includes determining at least one candidate expansion bus slot from the plurality of expansion bus slots. Each candidate expansion bus slot is physically compatible with the selected candidate expansion device and has a flow control limit larger than the average flow control usage of the selected candidate expansion device.

Assigning the candidate expansion device to one of the plurality of expansion bus slots includes selecting a candidate expansion bus slot having a highest flow control limit. The selected candidate expansion bus slot is coupled to an incumbent expansion device. Assigning the candidate expansion device to one of the plurality of expansion bus slots may include determining that the incumbent expansion device is physically compatible with the incumbent expansion bus slot. Assigning the candidate expansion device to one of the plurality of expansion bus slots may include determining that the average flow control usage of the incumbent expansion device is less than or equal to the average flow control usage of the candidate expansion device.

In some embodiments, initializing the plurality of expansion bus registers includes allocating an extended capability register for each expansion bus slot for storing flow control data. In certain embodiments, initializing the plurality of expansion bus registers further includes identifying an unused expansion bus register for each expansion bus slot. Initializing the plurality of expansion bus registers includes allocating the identified registers for storing flow control data. Initializing the plurality of expansion bus registers includes resetting data values stored in the allocated expansion bus registers.

In some embodiments, extracting flow control data from the flow control packets includes calculating a number of available flow control credits. In some embodiments, writing flow control data to the plurality of expansion bus registers includes, for each of the plurality of expansion bus slots, storing an average flow control usage for an expansion device associated with the expansion bus slot.

The computer program product includes a computer readable storage medium that stores code executable by a processor, the executable code including code to initialize a plurality of expansion bus registers. Each expansion bus register is associated with one of a plurality of expansion bus slots. The executable code includes code to detect flow control packets on an expansion bus. The executable code includes code to calculate flow control data from the flow control packets. The flow control data relates to a plurality of expansion devices operating on the expansion bus. The executable code includes code to store flow control data to the plurality of expansion bus registers based on the flow control packets.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
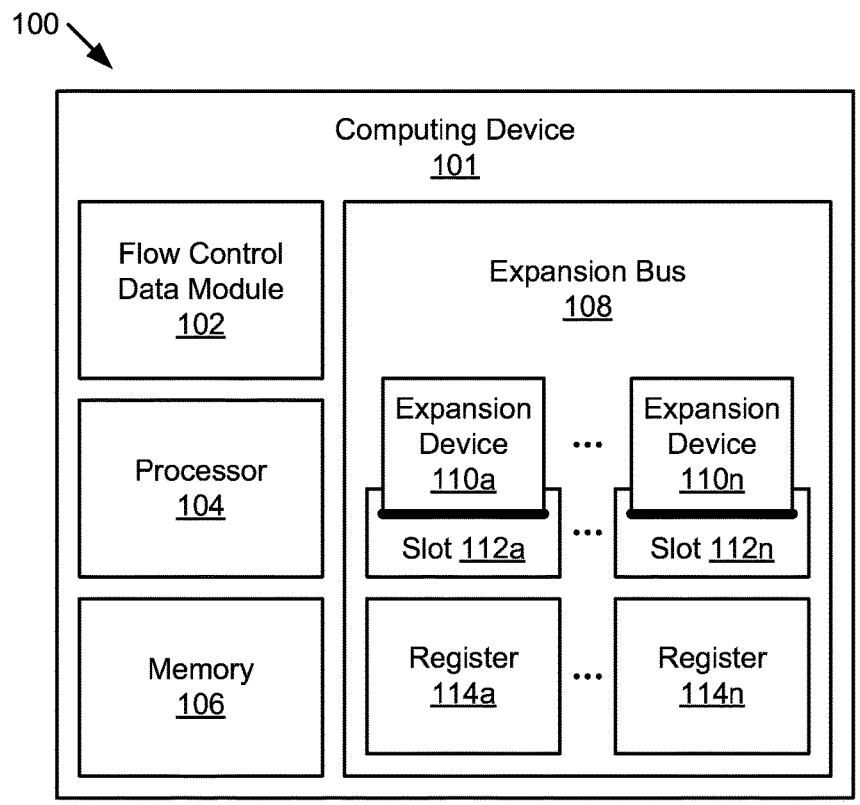
FIG. 1 is a schematic block diagram illustrating one embodiment of a computer system for optimizing expansion devices on a computer expansion bus based on real-time flow control data.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the described embodiments initialize a plurality of expansion bus registers, each expansion bus register being associated with an expansion bus slot, monitor for flow control packets on an expansion bus; extract flow control data from the flow control packets, the flow control data relating to a plurality of expansion devices operating on the expansion bus, and write flow control data to the plurality of expansion bus registers based on the flow control packets. Some of the described embodiments include calculating an arrangement of the plurality of expansion devices that optimizes throughput based on the flow control data, wherein each of the plurality of expansion devices is coupled to one of the plurality of expansion bus slot.

As used herein, flow control is the management of data flow on an expansion bus, for example between a central processor and one or more expansion devices, so that the data can be handled at an efficient pace. Too much data arriving before a device can handle it causes data overflow, meaning the data is either lost or must be retransmitted. In a credit-based flow control scheme, a receiving device allocates to a transmitting device a number of flow control credits, wherein the transmitting device consumes flow control credits with each transmission and is only allow to transmit when there are available flow control credits. The initial number of flow control credits may be based on the buffer space or other receiving capability of the receiving device, wherein the receiving device allocates additional flow control credits to the transmitting device as the receiving device processes received data.

Flow control data is calculated and stored in expansion bus registers so as to be readily available. Flow control usage is not generally known or published. Further, similar devices from different manufacturers may have different flow control usage statistics. Based on the flow control data, an arrangement of expansion devices that optimized flow control usage may be calculated. Care is taken to ensure that the calculated arrangement improves throughput.

To calculate an arrangement of the plurality of expansion devices that optimizes throughput based on the flow control data, flow control limits are identified, flow control usage data is gathered from traffic using the expansion devices, and an optimization routine is performed to optimally assign expansion devices to expansion bus slots based on the flow control data.

FIG. 1 is a schematic block diagram illustrating one embodiment of a computer system 100 for optimizing expansion devices on a computer expansion bus based on real-time flow control data, according to embodiments of the disclosure. The system 100 includes, in one embodiment, a computing device 101. The computing device 101 may include, but is not limited to, a server, a workstation, a mainframe computer, a supercomputer, a desktop computer, a laptop computer, a gaming console, a mobile phone, a smart phone, a tablet computer, or the like. The computing device 101 includes a flow control data module 102, a processor 104, a memory 106, and an expansion bus 108. The expansion bus 108 may itself include a plurality of expansion devices 110 a-n (collectively "110") coupled to a plurality of expansion bus slots 112 a-n (collectively "110"). Further, the expansion bus 108 may include a plurality of expansion bus registers 114a-n (collectively "114"). While depicted as residing in the expansion bus space, in other embodiments, the plurality of expansion bus registers 114 may reside in a basic input/output system ("BIOS") space, or in the memory 106.

The flow control data module 102, in one embodiment, is configured to initialize a plurality of expansion bus registers 114, where each expansion bus register 114 is associated with one of a plurality of expansion bus slots 112. The flow control data module 102 may also be configured to monitor for flow control packets on an expansion bus 108 and to extract flow control data from the flow control packets. The flow control data relates to a plurality of expansion devices 110 operating on the expansion bus 108. The flow control data module 102 may further write flow control data to the plurality of expansion bus registers based on the flow control packets. In some embodiments, the flow control data module 102 may calculate an arrangement of the plurality of expansion devices 110 that optimizes throughput based on the flow control data.

The flow control data module 102 may include computer hardware, computer software, or a combination of both computer hardware and computer software. For example, the flow control data module 102 may include circuitry, or a processor, configured to monitor for flow control packets on an expansion bus. As another example, the flow control data module 102 may include computer program code that allows the processor 104 to extract flow control data from the flow control packets and/or write flow control data to the plurality of expansion bus registers. The flow control data module 102 is discussed in further detail with reference to FIGS. 2-3, below.

The processor 104, in one embodiment, may include any known controller capable of executing computer-readable instructions and/or capable of performing logical operations. For example, the processor 104 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 104 executes instructions stored in the memory 106 to perform the methods and routines described herein. The processor 104, in one embodiment, is communicatively coupled to the flow control data module 102, the memory 106, and the expansion bus 108.

The memory 106, in one embodiment, is a computer readable storage medium. In some embodiments, the memory 106 includes volatile computer storage media. For example, the memory 106 may include a random access memory ("RAM"), including dynamic RAM ("DRAM"), synchronous dynamic RAM ("SDRAM"), and/or static RAM ("SRAM"). In some embodiments, the memory 106 includes non-volatile computer storage media. For example, the memory 106 may include a hard disk drive, a flash memory, or any other suitable non-volatile computer storage device. In some embodiments, the memory 106 includes both volatile and non-volatile computer storage media.

In some embodiments, the memory 106 stores data relating to optimizing expansion devices on a computer expansion bus based on real-time flow control data. For example, the memory 106 may store expansion bus parameters, expansion device arrangements, expansion device identifiers, flow control data, lists of candidate expansion devices or candidate expansion bus slots, and the like. In some embodiments, the memory 106 also stores program code and related data, such as an operating system or other controller algorithms operating on the computing device 101.

The expansion bus 108 provides an interface between the processor 104 and one or more expansion devices 110. The expansion bus 108 refers to the mechanical and electrical connections coupling the one or more expansion devices 110 to the processor 104. In some embodiments, the expansion bus 108 complies with an industry standard, such as the Peripheral Component Interconnect ("PCI"), PCI extended ("PCI-X"), PCI Express ("PCIe"), and Accelerated Graphics Port ("AGP") standards.

As depicted, the plurality of expansion bus slots 112 may include slots 112a-112n and the plurality of expansion bus registers 114 may include registers 114a-114n. Each expansion bus slot 112 may receive an expansion device 110, such as one of expansion devices 110a-110n. While FIG. 1 depicts an equal number of expansion devices 110 and expansion bus slots 112, in other embodiments the computing device 101 may include more expansion bus slots 112 than expansion devices 110 (e.g., the expansion bus 108 may include unused expansion bus slots 112). Further, while FIG. 1 depicts an equal number of expansion bus slots 112 and expansion bus registers 114, in other embodiments the computing device 101 may include more expansion bus registers 114 than expansion bus slots 112.

The expansion devices 110 are auxiliary devices that add functionality to the computing system 101 via the expansion bus 108. An expansion device may also be known as an expansion board, expansion card, adapter board, adapter card, or accessory card. Each expansion bus slot 112 is configured to communicatively couple the expansion device 110 to the processor 104. In some embodiments, an expansion device 110 may be configured to provide additional processing capabilities to the computing device 101. For example, the plurality of expansion devices 110 may include an additional CPU (e.g., a co-processor), a graphics card (e.g., having a GPU for graphics processing), a sound card (e.g., having a microprocessor for audio/voice signal processing), or other auxiliary processor.

In one embodiment, an expansion device 110 may be configured to provide additional data storage capabilities to the computing device 101. For example, the plurality of expansion devices 110 may include a removable storage device adapter, an external storage device adapter, or the like. In some embodiments, the expansion device 110 may include a microprocessor (e.g., a storage controller) for controlling a storage device coupled to the expansion device 110. In another embodiment, an expansion device 110 may be configured to provide networking capabilities to the computing device 101. For example, the plurality of expansion devices 110 may include a wireless network adapter, a wired network adapter (e.g., an Ethernet adapter), a modem, or the like.

In certain embodiments, an expansion device 110 may be an adapter configured to couple an additional peripheral device to the computing device 101 and to convert data from one communication standard to another. For example, the expansion device 110 may be an adapter comprising a serial port (e.g., a serial ATA ("SATA")), a parallel port, a universal serial bus ("USB") port, or the like. In further embodiments, the expansion device 110 may be an adapter for adapting another expansion device that uses a different connecter and/or communication standard than provided by the expansion bus 108. For instance, the expansion device 110 may be a PCIe adapter capable of receiving a personal computer memory card international association ("PCMCIA") standard card, an ExpressCard® device, or the like.

Figure 2:
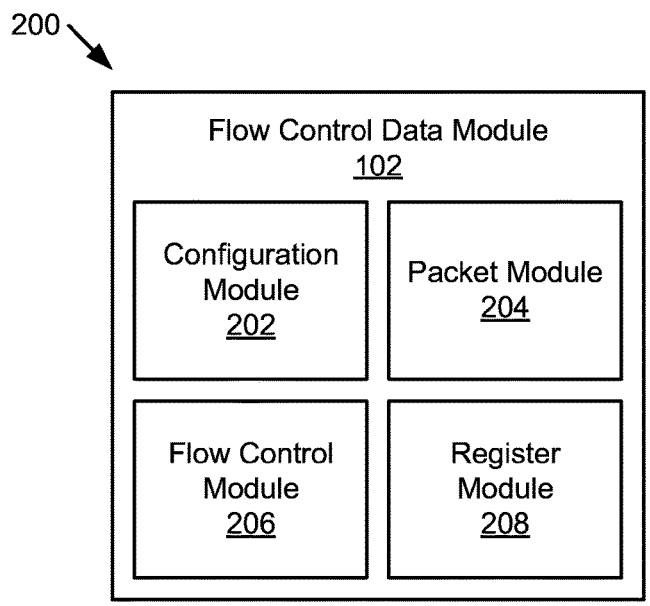
FIG. 2 is a schematic block diagram illustrating one embodiment of an apparatus for optimizing expansion devices on a computer expansion bus based on real-time flow control data.

FIG. 2 is a schematic block diagram illustrating one embodiment of a flow control data apparatus 200 for optimizing expansion devices on a computer expansion bus based on real-time flow control data, according to embodiments of the disclosure. The flow control data apparatus 200 includes a flow control data module 102, which may be substantially similar to the flow control data module 102 described above with reference to FIG. 1. The flow control data module 102, in one embodiment, includes a configuration module 202, a packet module 204, a flow control module 206, and a register module 208, which are described below. The modules 202-208 of the flow control data module 102 may be communicatively coupled to one another.

The configuration module 202, in one embodiment, is configured to initialize a plurality of expansion bus registers 114, each expansion bus register 114 being associated with one of the plurality of expansion bus slots 112. The expansion bus registers 114 are located in the expansion bus 108. In certain embodiments, each expansion bus slot 112 includes one or more expansion bus registers 114. The configuration module 202 may initialize an expansion bus register 114 for each expansion bus slot 112 coupled to an expansion device 110.

In some embodiments, the configuration module 202 initializes the expansion bus registers 114 by activating an otherwise unused expansion bus register 114. For example, the configuration module 202 may activate an extended capability register, such as a Vendor Specific Extended Capability register found in a PCIe expansion bus. Initializing the expansion bus registers 114 may further include programming the expansion bus registers 114 and/or registering the expansion bus registers 114 to prevent other devices or processes from writing to the expansion bus registers 114.

In certain embodiments, the configuration module 202 may identify available expansion bus registers 114 and allocate an expansion bus register 114 to each expansion bus slot 112 for storing flow control data. The flow control data relates to real-time flow control of an expansion device 110 coupled to that expansion bus slot 112, as discussed below in further detail. For example, the configuration module 202 may identify an unused expansion bus register 114 for each expansion bus slot 112 coupled to an expansion device 110. The configuration module 202 may assign the unused expansion bus registers 114 for storing flow control data. In another example, the configuration module 202 may reallocate a previously assigned expansion bus register 114 to an expansion bus slot 112 for storing flow control data relating to an expansion device 110 coupled to that expansion bus slot 112.

In some embodiments, the configuration module 202 resets the plurality of expansion bus registers 114. For example, the configuration module 202 may reset the expansion bus registers 114 in response to allocating the expansion bus registers 114 for storing flow control data. In another example, the configuration module 202 may reset the expansion bus registers 114 in response to a change in the arrangement of the plurality of expansion devices 110, as discussed in further detail below.

The configuration module 202 beneficially allows tracking of flow control data. Conventionally, flow control data is not tracked by the expansion bus 108 and is only obtainable by attaching a protocol analyzer to the expansion bus 108. The configuration module 202 allocates registers on the expansion bus 108 to store the flow control data, allowing the flow control data to be accessed within the computing device 101. Conventionally, the expansion bus registers 114 are not used to store flow control data. The configuration module 202, in one embodiment, repurposes some of the registers on the expansion bus, for example a set of extended capability registers, to store flow control data allowing for its access within the computing device 101.

The packet module 204, in one embodiment, is configured to monitor flow control packets on an expansion bus 108. As used herein, monitoring flow control packets refers to receiving (e.g., intercepting) packets relating to flow control between an expansion bus slot 112 and its coupled expansion device 110. In some embodiments, the flow control packets may indicate a number of flow control credits available to the expansion device 110, the number of flow control credits relating to buffer space of the receiving device. In certain embodiments, the packet module 204 forwards flow control packets to the flow control module 206, wherein the flow control module 206 extracts flow control data from the flow control packets. The packet module 204 may monitor for and report the flow control packets in real-time.

For example, a limited amount of flow control credits may be issued by a receiving device, wherein a transmitting device consumes the flow control credits with each transmission. The transmitting device may only transmit a packet if doing so will not cause the amount of consumed flow control credits to exceed its credit limit, so as not to overflow the receiving device's buffers. Flow control packets may be sent by the receiving device to update flow control credit limits at the transmitting device, thereby allowing the transmitting device to transmit additional packets without overflowing the receiving device's buffers.

In a further embodiment, different pools of flow control credits may be maintained for different types of data packets, wherein the flow control packets update a flow control credit limit for a particular pools of flow control credits. Examples of different flow control credit types include: posted requests transaction layer packet ("TLP") headers, posted requests TLP data, non-posted requests TLP headers, non-posted requests TLP data, completion TLP headers, completion TLP data, and the like. In some embodiments, the packet module 204 may monitor for any type of flow control packets, while in other embodiments the packet module 204 may monitor only for certain types of flow control packets.

The flow control module 206, in one embodiment, is configured to calculate flow control data from the flow control packets, the flow control data relating to a plurality of expansion devices 110 operating on the expansion bus 108. In certain embodiments, the flow control data may include: an average flow control usage for each expansion device, a ratio of average flow control usage to flow control limit for each expansion device, an average amount of unused flow control credits for each expansion device, and/or a number of times the expansion device reaches the flow control limit. In a further embodiment, the flow control data may include operating requirements and/or limitations of the expansion devices 110 and/or the expansion bus slots 112, including lane width requirements, physical sizes, flow control limits, and the like. The flow control module 206, in one embodiment, extracts flow control limits from the flow control packets to calculate the flow control data. For example, the flow control module 206 may calculate flow control usage and/or an amount of unused flow control credits based of the flow control packets.

In some embodiments, the flow control module 206 calculates the flow control data over a particular period of time. In one embodiment, the flow control module 206 may identify peak usage times of the computing device 101 and calculate the flow control data over the peak usage times. For example, the computing device 101 may be a web server whose peak usage time is a three-hour period from 11:00 AM to 2:00 PM. Thus, the flow control module 206 may calculate flow control data, such as flow control usage and/or an amount of unused flow control credits, over a 24-hour period or a shorter period centered on the peak usage time. In certain embodiments, an average flow control usage and/or an average amount of unused flow control credits is computed over the peak usage time. The peak usage time may be manually entered by a user and/or may be automatically determined by the flow control module 206. In certain embodiments, the flow control module 206 may identify a number of times the expansion device 110 reaches the flow control limit during the peak usage time.

In some embodiments, the flow control module 206 identifies an initial flow control credit limit for each expansion bus slot 112. For example, the packet module 204 may intercept a flow control packet announcing the initial limit, wherein the flow control module 206 identifies the initial flow control limit from the flow control packets. Specifically, an "InitFC" packet on a PCIe bus may be intercepted and parsed to identify the initial flow control credit limit for each expansion bus slot 112. The initial flow control limit may then be used by the flow control module 206 to calculate a ratio of average flow control usage to flow control limit for each expansion device (e.g., a percentage of the initial flow control credit limit used, on average, by the expansion device). In response to calculating the flow control data, the flow control module 206 reports the flow control data to the register module 208, wherein the register module 208 writes the flow control data to the expansion bus registers 114. In certain embodiments, the flow control module 206 may continuously calculate the flow control data based on the received flow control packets, for example by updating the flow control data as each flow control packet is received. In some embodiments, the flow control module 206 may report the flow control data to the register module 208 at regular intervals, such as every second, minute, hour, or the like.

The register module 208, in one embodiment, is configured to write flow control data to the plurality of expansion bus registers 114. In some embodiments, the register module 208 may be a controller or driver for writing data to the expansion bus registers 114. The register module 208 receives the flow control data from the flow control module 206. For example, the register module 208 may periodically receive reports from the flow control module 206 which include the flow control data, wherein the register module 208 writes the flow control data to the plurality of expansion bus registers 114 in response to receiving a report. As an example, a report from the flow control module 206 may include updated values for an average flow control usage for each expansion device, a ratio of average flow control usage to flow control limit for each expansion device, an average amount of unused flow control credits for each expansion device, and/or a number of times the expansion device reaches the flow control limit. In certain embodiments, the register module 208 overwrites previous flow control data in the expansion bus registers 114 with the updated values.

Figure 3:
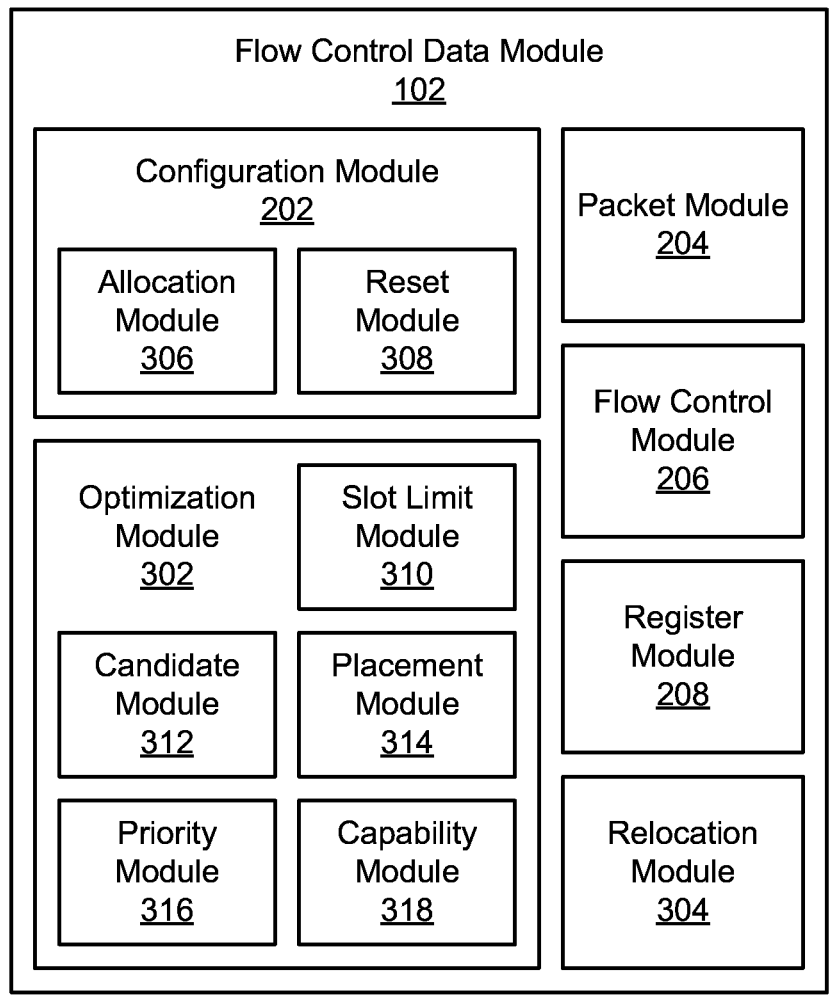
FIG. 3 is a schematic block diagram illustrating another embodiment of an apparatus for optimizing expansion devices on a computer expansion bus based on real-time flow control data.

FIG. 3 is a schematic block diagram illustrating another embodiment of a flow control data apparatus 300 for optimizing expansion devices on a computer expansion bus based on real-time flow control data, according to embodiments of the disclosure. The flow control data apparatus 300 includes a flow control data module 102, which may function substantially similar to the flow control data module 102 described above with reference to FIG. 1. The flow control data module 102, in one embodiment, includes a configuration module 202, a packet module 204, a flow control module 206, and a register module 208, which may be substantially similar to those described in relation to the apparatus 200 of FIG. 2. In some embodiments, the flow control data module 102 may also include: an optimization module 302, a relocation module 304, an allocation module 306, a reset module 308, a slot limit module 310, a candidate module 312, a placement module 314, a priority module 316, and/or a capability module 318, which are described below. The modules 202-208 and 302-318 of the flow control data module 102 may be communicatively coupled to one another.

The configuration module 202 may be substantially described above with reference to FIG. 2. In some embodiments, the configuration module 202 further includes an allocation module 306 and/or a reset module 308. The allocation module 306, in one embodiment, is configured to identify an unused expansion bus register 114 for each expansion bus slot 112. In some embodiments, the allocated expansion bus register 114 may be an extended capability register, for example a Vendor-Specific Extended Capability ("VSEC") register found in a PCIe expansion bus. The allocation module 306, in certain embodiments, may identify one or more candidate expansion bus registers 114 for each expansion bus slot 112 and determine whether the candidate expansion bus registers 114 are available for use in storing flow control data (e.g., whether they are unused). For example, the allocation module 306 may check a registry to determine whether the candidate expansion bus registers 114 are available.

The allocation module 306 is further configured to allocate the identified expansion bus registers 114 for storing flow control data for each expansion bus slot 112. In certain embodiments, the allocation module 306 may register the expansion bus registers 114 with a registry to prevent another device, module, and/or application from using the allocated expansion bus registers 114, so as to prevent corruption of the flow control data. In some embodiments, the allocation module 306 may allocate storage space outside the expansion bus 108 for storing the flow control data. For example, the allocation module 306 may reserve storage space in non-volatile storage media of the computing device 101 in order to preserve older flow control data for future comparison and/or in response to being unable to locate unused expansion bus registers 114.

In some embodiments, the allocation module 306 indicates the allocated expansion bus registers 114 to the reset module 308, wherein the reset module 308 erases data values already stored in the allocated expansion bus registers 114. In other embodiments, the register module 208 may simply overwrite data values already stored in the expansion bus registers 114, in response to the allocation module 306 identifying and assigning expansion bus registers 114 for storing flow control data.

The reset module 308, in one embodiment, is configured to delete data values stored in the plurality of expansion bus registers 114 allocated for storing flow control data in response to the allocation module 306 assigning an expansion bus register 114 to each expansion bus slot 112. In some embodiments, the reset module 308 may be further configured to delete data values stored in the expansion bus registers 114 in response to at least one expansion device 110 being relocated, wherein the register module 208 writes new flow control data to the plurality of expansion bus registers 114 based on the relocated expansion device 110.

The optimization module 302, in one embodiment, is configured to calculate an arrangement (e.g., a placement order) of the plurality of expansion devices 110, based on the flow control data, to maximize expansion bus 108 throughput. In some embodiments, data transfer from certain expansion devices 110 may be limited by flow control constraints, such as a flow control limit of the expansion bus slot 112 to which the expansion device 110 is coupled. The optimization module 302 reads flow control data (e.g., flow control metrics and/or statistics) relating to the expansion devices 110 and calculates an arrangement of the expansion devices (e.g., a mapping of which expansion device 110 is to be placed in which expansion bus slot 112) based on the flow control data.

In some embodiments, the optimization module 302 considers the average flow control usage of the expansion devices 110 when calculating an optimal arrangement of the expansion devices based on flow control data. In certain embodiments, the optimization module 302 may consider additional flow control data, such as a ratio of average flow control usage to flow control limit for each expansion device, an average amount of unused flow control credits for each expansion device, and/or a number of times the expansion device reaches the flow control limit. In some embodiments, the optimization module 302 includes a slot limit module 310, a candidate module 312, a placement module 314, a priority module 316, and/or a capability module 318 which assist in calculating an optimal arrangement of the expansion devices based on flow control data, as described below.

The optimization module 302 begins with assigning the expansion device 110 having the highest average flow control usage and that is sufficiently near the flow control limit of its expansion bus slot 112 (e.g., within a threshold percentage of the flow control limit) and continues to assigns those expansion devices 110 sufficiently near the flow control limit of their expansion bus slots 112, in order from highest to lowest average flow control usage, until all expansion devices 110 are assigned to expansion bus slots 112. If an expansion device 110 is not sufficiently near the flow control limit of its expansion bus slot 112, then the optimization module 302 may tentatively assign it to its current expansion bus slot 112 unless another expansion device 110 of higher average flow control usage is assigned to that expansion bus slot 112, as described below in greater detail.

Upon assigning all expansion devices 110 to an expansion bus slot 112, the optimization module 302 may instruct a user to rearrange the expansion devices 110 into the assigned locations. In some embodiments, the optimization module 302 may instruct the user to rearrange the expansion devices 110 between assigning expansion devices 110 to expansion bus slots 112. For example, the optimization module 302 may assign the expansion device 110 having the highest average flow control usage, instruct the user to swap the expansion device 110 into its new expansion bus slot 112, and calculate a location for the expansion device 110 having the next highest average flow control usage after the swap. In certain embodiments, the optimization module 302 may determine a placement order of the expansion devices 110, instruct the user to move the expansion devices 110, and recalculate the placement order in response to the expansion devices 110 being moved. The optimization module may continue to recalculate the placement order until the calculated placement order matches a current placement order, thereby indicating that the current placement order is an optimal arrangement of the expansion devices 110.

The slot limit module 310, in one embodiment, is configured to identify flow control limits for each of the plurality of expansion bus slots 112. For example, the slot limit module 310 may monitor configuration data for each expansion bus slot 112 on the expansion bus 108. In some embodiments, the slot limit module 310 monitors for packets sent on the expansion bus announcing an initial flow control limits (e.g., for a link comprising an expansion device and an expansion slot coupling the expansion device to the expansion bus). The initial flow control limits may be stored, for example in the expansion bus registers 114, wherein the slot limit module 310 reads the flow control limits from the expansion bus registers.

The candidate module 312, in one embodiment, is configured to determine at least one candidate device from the plurality of expansion devices 110. The candidate module 312 compares, for each of the plurality of expansion bus slots 112, an average flow control usage for an expansion device 110 using the expansion bus slot 112 to an identified operating limit for the expansion bus slot 112, wherein the candidate module 312 determines at least one candidate device based on the comparison. In certain embodiments, the flow control data includes average flow control usage for each of the plurality of expansion devices 110.

To be a candidate device, an expansion device 110 may have an average flow control usage that is within a predetermined amount of the expansion bus slot currently coupled to the expansion device. In some embodiments, the predetermined amount is a threshold percentage of the flow control limit (e.g., 90%, 95%, or even 100% of the flow control limit). Alternatively, to be a candidate device, an expansion device may have an average amount of unused flow control credits less than a threshold amount. Each candidate device is associated with an incumbent slot. As used herein, an incumbent slot refers to an expansion bus slot 112 currently coupled with the candidate device.

In some embodiments, the candidate module 312 determines whether any candidate devices exist. In response to no candidate devices existing, the candidate module 312 may signal the optimization module 302 that the current arrangement of expansion devices 110 is an optimal arrangement of the expansion devices 110. Otherwise, the candidate module 312 may generate a list of candidate devices and provide the list to the placement module 314. In certain embodiments, the candidate module 312 provides the list of candidate devices by accessing a mapping structure storing a current arrangement of the expansion devices and expansion bus slots so as to indicate, within the mapping structure, those expansion devices which qualify as candidate devices. For example, an entry in the mapping structure corresponding to a candidate device may be flagged to indicate that the expansion device is a candidate device.

In some embodiments, the candidate module 312 is further configured to determine at least one candidate slot for a candidate device, from among the plurality of expansion bus slots 112. For example, the candidate module 312 may compare, for each of the plurality of expansion bus slots 112, a flow control limit to the average flow control usage of the candidate device. To be a candidate slot, an expansion bus slot 112 must have a flow control limit larger than the average flow control usage of the selected candidate device and it must be physically compatible with the candidate expansion device. In certain embodiments, the candidate module 312 queries the capability module 318, wherein the capability module 318 determines whether an expansion bus slot 112 is physically compatible with the candidate expansion device, as discussed below in further detail. In some embodiments, the candidate slot may be associated with an incumbent device. As used herein, an incumbent device refers to an expansion device currently coupled with the candidate slot. In other embodiments, the candidate slot may be empty.

The placement module 314, in one embodiment, is configured to assign each candidate expansion device 110 to one of the plurality of expansion bus slots 112 based on the average flow control usage and the flow control limits. In some embodiments, the placement module 314 first assigns the candidate device with the highest average flow control usage and proceeds to assign the remaining candidate devices from highest to lowest average flow control usage. In certain embodiments, the placement module 314 may query the priority module 316 for a ranking of candidate devices from highest to lowest average flow control usage, wherein the placement module 314 assigns each candidate expansion device to one of the plurality of expansion bus slots 112 in an order based on the ranking of each candidate expansion device.

The placement module 314, in one embodiment, identifies a candidate expansion device having the highest average flow control usage and identifies a candidate expansion bus slot having a highest flow control limit. In certain embodiments, the placement module 314 queries the candidate module 312 for a list of at least one candidate expansion bus slot for the identified candidate device from among the plurality of expansion bus slots 112. As discussed above, each candidate expansion bus slot must have a flow control limit larger than the average flow control usage of the candidate expansion device and be physically compatible with the candidate expansion device. In some embodiments, the candidate module 312 determines whether an expansion device 110 is a candidate for rearrangement (e.g., a candidate device). The candidate module 312 further identifies one or more candidate expansion bus slots among the plurality of expansion bus slots 112 for each candidate device. For example, the candidate module 312 may determine whether an expansion bus slot 112 has a flow control limit larger than the average flow control usage of the candidate expansion device while the capability module 318 determines whether the expansion bus slot 112 is physically compatible with the candidate expansion device.

In some embodiments, the placement module 314 identifies an incumbent expansion device located in the candidate expansion bus slot and verifies that the incumbent expansion device is physically compatible with the incumbent expansion bus slot. In certain embodiments, the placement module 314 queries the capability module 318 to determine whether the incumbent expansion device is physically compatible with the incumbent expansion bus slot. In response to an incumbent expansion device not being physically compatible with the incumbent expansion bus slot, the placement module 314 removes the candidate slot hosting the physically incompatible incumbent expansion device from the list of candidate slots.

In one embodiment, the placement module 314 verifies the average flow control usage of the incumbent expansion device is less than or equal to the average flow control usage of the candidate expansion device. In response to the average flow control usage of the incumbent expansion device being greater than the average flow control usage of the candidate expansion device, the placement module 314 removes the candidate slot from the list of candidate slots, as moving the candidate device to the candidate slot will worsen performance of the expansion bus 108. In some embodiments, the placement module 314 accesses the flow control data stored in the expansion bus registers 114 and compares the average flow control usage of the incumbent expansion device to the average flow control usage of the candidate expansion device.

The placement module 314 assigns the selected candidate device to the candidate slot with the highest flow control limit that also meet the above criteria (e.g., incumbent device physically compatible, not of greater average flow control usage, etc.). If the list of candidate slots becomes empty, then the placement module 314 assigns the candidate device to its current expansion bus slot 112. After assigning the candidate device with the highest average flow control usage to an expansion bus slot 112, the placement module 314 proceeds to iteratively assign any remaining candidate devices in the same manner, in order from highest to lowest average flow control usage, until all candidate devices have been assigned to expansion bus slots 112. In some embodiments, once an expansion bus slot 112 is assigned to a candidate device, that same expansion bus slot 112 is not considered by the placement module 314 when subsequently placing any remaining candidate devices, so as to consider a lesser number of candidate slots, thereby improving speed of placement.

The priority module 316, in one embodiment, is configured to rank the at least one candidate expansion device 110 based on highest average flow control usage. In some embodiments, the priority module 316 receives a list of candidate devices from among the plurality of expansion devices 110 and acquires average flow control usage for each candidate device. In some embodiments, the flow control data stored in the expansion bus registers 114 includes average flow control usage for each expansion device 110. In other embodiments, the average flow control usage may be computed from the flow control data stored in the expansion bus registers 114. In response to receiving the average flow control usage for each candidate device, the priority module 316 ranks the candidate devices, for example from highest average flow control usage to lowest average flow control usage. In some embodiments, the priority module 316 indicates a candidate device's ranking in the list of candidate devices.

The compatibility module 318, in one embodiment, is configured to compare a physical size of an expansion device 110 to a size supported by an expansion bus slot 112, wherein the placement module 314 assigns each candidate expansion device 110 to one of the plurality of expansion bus slots 112 based on the size comparison. Each of the plurality of expansion devices 110 may have a connection of different sizes based on the purpose the particular expansion device 110. For example, an expansion device 110 that is a graphics card may have a physically larger connection to support greater bandwidth of data transfer, while an expansion device 110 that is a networking card may have a physically smaller connection to support a lesser bandwidth. Similarly, each of the plurality of expansion bus slots 112 may have a connection of different size.

In some embodiments, the compatibility module 318 identifies configuration data for each of the plurality of expansion bus slots 112, the configuration data indicating a physical size and/or a lane width size of the expansion bus slot 112. For example, in a PCIe system a first PCIe slot (e.g., expansion bus slot 112a) may be physically sized to support up to 16 lanes, while a second PCIe slot (e.g., expansion bus slot 112n) may be physically sized to support up to 4 lanes, wherein each lane is a physical electrical connection for transferring data on the PCIe bus. In this example, a PCIe adapter with four lanes is be coupled to either PCIe slot, while a PCIe adapter with eight lanes may only couple to the first PCIe slot (e.g., the 16 lane PCIe slot). The compatibility module 318 further identifies a physical size of expansion device 110 coupled to a particular expansion bus slot 112. In certain embodiments, the compatibility module 318 receives configuration information from an expansion device 110 indicating a physical size of expansion device 110.

In response to identifying physical sizes of the plurality of expansion bus slots 112 in the plurality of expansion devices 110, the compatibility module 318 determines whether a particular expansion device 110 will physically fit in a particular expansion bus slot 112. For example, the compatibility module 318 may determine into which of the plurality of expansion bus slots 112 a candidate device will physically fit. As another example, the compatibility module 318 may determine whether an incumbent device already located in a candidate slot will physically fit in an incumbent slot already occupied by the candidate device. In response to comparing a physical size of expansion device 110 to a physical size of an expansion bus slot 112, the compatibility module 318 may return, to the placement module 314 and/or the optimization module 302, an indication of whether the expansion device 110 will physically fit into the expansion bus slot 112.

In some embodiments, the compatibility module 318 is further configured to compare an electrical connection requirement of an expansion device 110 to a number of electrical connections provided by an expansion bus slot 112, wherein the placement module 314 assigns an expansion device 110 to one of the plurality of expansion bus slots 112 based on the number of electrical connections. Each expansion bus slot 112 may comprise a maximum number of electrical connections, wherein the expansion bus slot 112 may provide up to the maximum number of electrical connections to an expansion device 110. Additionally, an expansion device 110 may require a minimum number of electrical connections for proper function. The compatibility module 318 identifies the minimum number of electrical connections required by the expansion device 110 as well as the maximum number of electrical connections provided by the expansion bus slot 112. The compatibility module 318 then compares these numbers to determine whether the expansion bus slot 112 provides at least the minimum number of electrical connections required by the expansion device 110.

The relocation module 304, in one embodiment, is configured to prompt a user to relocate at least one of the plurality of expansion devices 110 into a different expansion bus slot 112. In some embodiments, the capability module 318 may prompt the user via visual indicator, audible indicator, or combinations thereof. In certain embodiments, the prompt may be a message indicating that an arrangement optimizing the expansion devices 110 based on flow control has been calculated, wherein the message further indicates the calculated arrangement. In certain embodiments, the prompt may include instructions for swapping expansion devices 110, including specific locations for the expansion devices 110, a specific order in which the expansion devices 110 should be placed, and the like.

In some embodiments, the relocation module 304 sends the prompt to a second computing device, such as an electronic device used by an administrator tasked with swapping the expansion devices 110. The second computing device may include, but is not limited to, a mobile phone, a smart phone, a tablet computer, a laptop computer, a desktop computer, a portable gaming console, or the like. The second computing device displays the prompt, which may include the calculated arrangement optimizing the expansion devices 110 based on flow control and/or instructions for swapping expansion devices 110. Thus, the administrator may refer to the arrangement and/or instructions using the second computing device, while relocating the expansion devices 110 of the computing device 101.

In certain embodiments, the relocation module 304 determines whether the expansion device 110 have been relocated. In one embodiment, the relocation module 304 compares expansion device identifiers (e.g., current values to previous values) to determine whether the expansion device 110 have been relocated. For example, the relocation module 304 may store a table mapping expansion device identifiers to expansion bus slot identifiers at the time the arrangement is calculated and periodically compare current expansion device identifiers to the table. In a further embodiment, the relocation module 304 may compare current expansion device identifiers to expected identifiers based on the calculated arrangement of expansion devices 110, so as to determine whether the expansion devices 110 have been arranged into the calculated arrangement.

In some embodiments, one or more of the expansion devices 110 may be hot-swappable, meaning one expansion device 110 may be removed from its expansion bus slot 112 while the computing device 101 remains powered on (e.g., in operation) and another expansion device 110 placed in the vacated expansion bus slot 112 while the computing device 101 remains powered on. Accordingly, the relocation module 304 may store an identifier of the expansion devices 110 coupled to the expansion bus slots 112 at the time the arrangement is calculated, determine whether an expansion device 110 is removed during operation of the computing device 101, determine that an expansion device 110 is placed into the recently vacated expansion bus slot 112, read an identifier of the newly placed expansion device 110, and compare the identifiers to determine whether an different expansion device 110 has been swapped into the expansion bus slot 112.

In some embodiments, one or more of the expansion devices 110 may not be hot-swappable, meaning one expansion device 110 may only be removed from its expansion bus slot 112 after the computing device 101 is powered down (e.g., in operation) and another expansion device 110 placed in the vacated expansion bus slot 112 while the computing device 101 remains powered down. Accordingly, the relocation module 304 may store an identifier of the expansion devices 110 coupled to the expansion bus slots 112 at the time the arrangement is calculated, read the identifiers of the expansion devices 110 located in the expansion bus slots 112 when the computing device 101 is powered on, and compare the identifiers to determine whether any of the expansion devices 110 have been swapped.

In some embodiments, the relocation module 304 may again prompt the user to relocate the expansion devices 110 in response to determining that the expansion devices 110 have not been relocated (or, alternatively, that the expansion devices 110 have not been arranged into the calculated arrangement). In further embodiments, the relocation module 304 may refrain from again prompting the user to relocate the expansion devices 110 if a predetermined time period has not passed, so as to not annoy the user. For example, the relocation module 304 may again prompt the user if no relocation of the expansion devices 110 is detected in a predetermined time period, such as an hour or day (or fractions thereof). In response to determining that the expansion devices 110 have been relocated, the relocation module 304 may signal the reset module 308 of the new arrangement, wherein the reset module 308 erases the expansion bus registers 114 and the flow control module 206 calculates new flow control data based on the relocated expansion devices 110.

Figure 4:
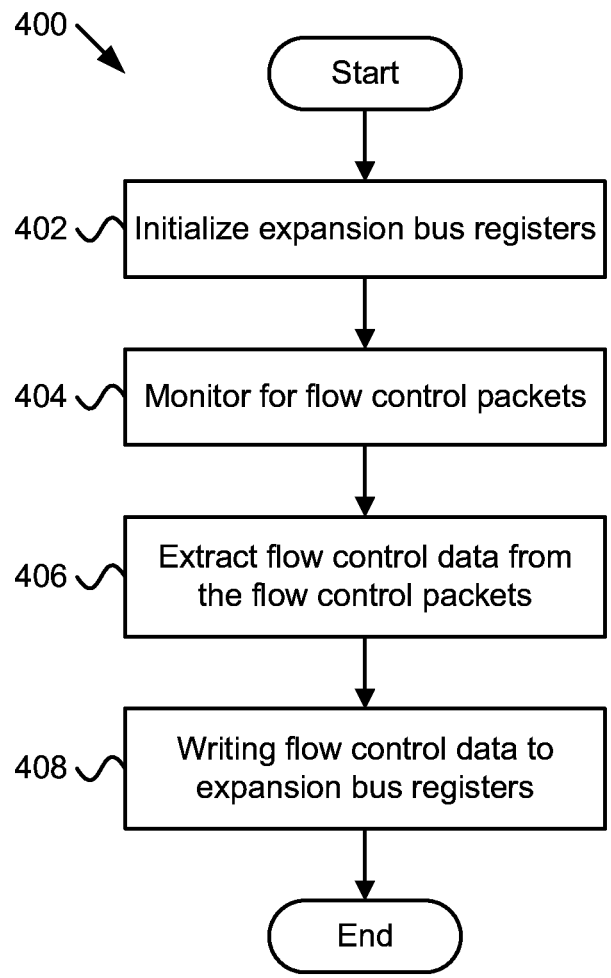
FIG. 4 is a schematic flow chart diagram illustrating one embodiment of a method for optimizing expansion devices on a computer expansion bus based on real-time flow control data.

FIG. 4 is a schematic flow chart diagram illustrating one embodiment of a method 400 for optimizing expansion devices on a computer expansion bus based on real-time flow control data, according to embodiments of the disclosure. In some embodiments, the method 400 is performed by a computing device, such as the computing device 101 described above with reference to FIG. 1. In other embodiments, the method 400 may be performed by an apparatus for optimizing expansion devices on a computer expansion bus based on real-time flow control data, such as the flow control data apparatus 200 and/or the flow control data apparatus 300 described above with reference to FIGS. 2-3. In certain embodiments, the method 400 may be performed by a processor executing program code, for example, a microcontroller, a microprocessor, a central processing unit ("CPU"), a graphics processing unit ("GPU"), an auxiliary processing unit, a FPGA, or the like.

The method 400 begins and initializes 402 a plurality of expansion bus registers, for example, the expansion bus registers 114. In one embodiment, the configuration module 202 initializes 402 the plurality of expansion bus registers. Each expansion bus register is associated with one of a plurality of expansion bus slots, for example, the expansion bus slots 112. In one embodiment, initializing 402 the plurality of expansion bus registers includes allocating an extended capability register, such as a Vendor-Specific Extended Capability (VSEC) register found in a PCIe expansion bus, for each expansion bus slot for storing flow control data. In another embodiment, initializing 402 the plurality of expansion bus registers includes identifying an unused expansion bus register for each expansion bus slot, allocating the identified registers for storing flow control data, and resetting data values stored in the allocated expansion bus registers.

The method 400 monitors 404 for flow control packets on an expansion bus and extracts 406 flow control data from the flow control packets. In one embodiment, the packet module 204 monitors 404 for flow control packets on an expansion bus and the flow control module 206 extracts 406 flow control data from the flow control packets. The flow control data, in one embodiment, relates to a plurality of expansion devices operating on the expansion bus, for example, the expansion devices 110 operating on the expansion bus 108. In certain embodiments, monitoring 404 for flow packets includes listening for data link layer flow packets exchanged between an expansion slot and an expansion device coupled to the expansion slot. In some embodiments, extracting 406 flow control data from the flow control packets includes calculating a number of available flow control credits.

The method 400 writes 408 flow control data to the plurality of expansion bus registers based on the flow control packets. The method 400 ends. In one embodiment, the register module 208 writes 408 the flow control data to the plurality of expansion bus registers. In certain embodiments, writing 408 flow control data includes storing average flow control usage for each of the plurality on expansion devices. The average flow control usage for an expansion device is written 408 to the expansion bus register associated with the expansion bus slot coupled to the expansion device. Additionally, writing 408 flow control data may include storing flow control limits for each of the plurality of expansion bus slots.

Figure 5:
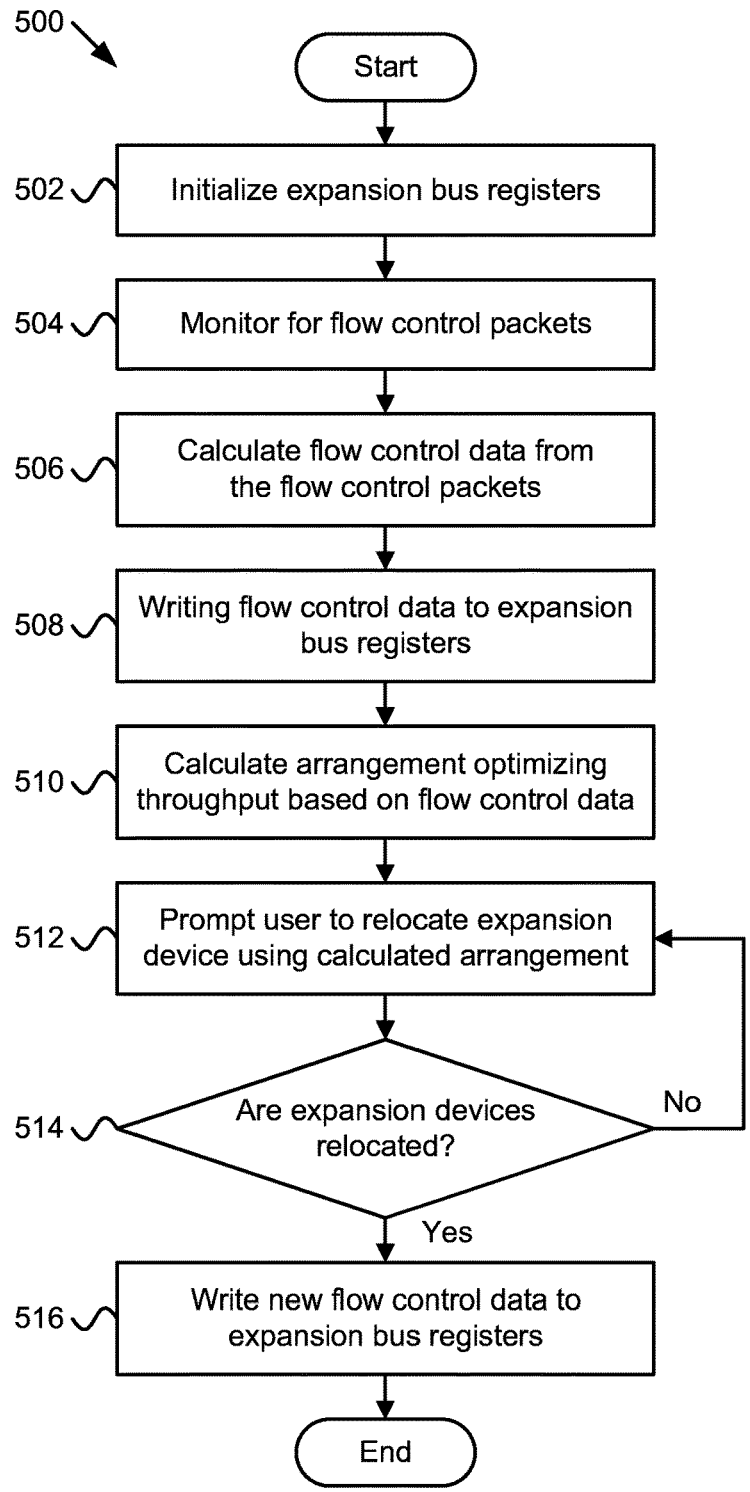
FIG. 5 is a schematic flow chart diagram illustrating another embodiment of a method for optimizing expansion devices on a computer expansion bus based on real-time flow control data.

FIG. 5 is a schematic flow chart diagram illustrating a method 500 for optimizing expansion devices on a computer expansion bus based on real-time flow control data, according to embodiments of the disclosure. In some embodiments, the method 500 is performed by a computing device, such as the computing device 101 described above with reference to FIG. 1. In other embodiments, the method 500 may be performed by an apparatus for optimizing expansion devices on a computer expansion bus based on real-time flow control data, such as the flow control data apparatus 200 and/or the flow control data apparatus 300 described above with reference to FIGS. 2-3. In certain embodiments, the method 500 may be performed by a processor executing program code, for example, a microcontroller, a microprocessor, a central processing unit ("CPU"), a graphics processing unit ("GPU"), an auxiliary processing unit, a FPGA, or the like.

The method 500 begins and initializes 502 a plurality of expansion bus registers, for example, the expansion bus registers 114. In one embodiment, the configuration module 202 initializes 502 the plurality of expansion bus registers. Each expansion bus register is associated with one of a plurality of expansion bus slots, for example, the expansion bus slots 112. In one embodiment, initializing 502 the plurality of expansion bus registers includes allocating an extended capability register (for example, a Vendor Specific Extended Capability ("VSEC") register) for each expansion bus slot for storing flow control data and resetting data values stored in the allocated registers.

The method 500 monitors 504 for flow control packets on an expansion bus and calculates 506 flow control data from the flow control packets. In one embodiment, the packet module 204 monitors 504 for flow control packets on an expansion bus and the flow control module 206 calculates 506 flow control data from the flow control packets. In response to calculating 506 flow control data, the method 500 writes 508 the flow control data to the plurality of expansion bus registers. In one embodiment, the register module 208 writes 508 the flow control data to the plurality of expansion bus registers. In certain embodiments, writing 508 flow control data includes storing average flow control usage for each of the plurality on expansion devices, a ratio of average flow control usage to flow control limit for each expansion device, an average amount of unused flow control credits, and/or storing flow control limits for each of the plurality of expansion bus slots.

The method 500 calculates 510 an arrangement that optimizes throughput of the plurality of expansion devices based on the flow control data. In one embodiment, the optimization module 302 calculates 510 an arrangement that optimizes throughput of the plurality of expansion devices based on the flow control data. Each of the plurality of expansion devices is coupled to one of the plurality of expansion slot. In some embodiments, the number of expansion slots is greater than the number of expansion devices. In other embodiments, the number of expansion slots is equal to the number of expansion devices.

Calculating 510 the arrangement of expansion devices optimizing throughput of the expansion devices may include assigning expansion devices to specific expansion bus slots, based on the flow control data, to maximize expansion bus throughput. In some embodiments, data transfer from certain expansion devices may be limited by flow control constraints, such as a flow control limit of the expansion bus slot to which the expansion device is coupled. Calculating 510 the arrangement optimizing throughput of the expansion devices may include identifying a flow control constrained expansion device and assigning it to an expansion bus slot with a higher flow control limit. In certain embodiments, calculating 510 the arrangement of expansion devices may include prioritizing expansion devices, wherein flow control constrained expansion device with higher average flow control usage are assigned to expansion bus slots with higher flow control limits. Calculating 510 the arrangement of expansion devices is discussed in further detail below, with reference to FIG. 6.

The method 500 prompts 512 a user to relocate at least one of the plurality of expansion devices into a different expansion bus slot based on the calculated arrangement. In one embodiment, the relocation module 304 prompts 512 a user to relocate at least one of the plurality of expansion devices into a different expansion bus slot based on the calculated arrangement. In some embodiments, prompting 512 the user to relocate an expansion device includes presenting a visual indicator, audible indicator, or combinations thereof. In certain embodiments, prompting 512 the user to relocate an expansion device includes indicating that an arrangement optimizing the expansion devices based on flow control has been calculated and further indicating the calculated arrangement. In another embodiment, prompting 512 the user to relocate an expansion device includes giving instructions for swapping expansion devices, including specific locations for the expansion devices, a specific order in which the expansion devices should be placed, and the like.

In some embodiments, prompting 512 the user to relocate an expansion device includes sending a message to a second computing device, such as an electronic device used by an administrator tasked with swapping the expansion devices. Prompting 512 the user to relocate an expansion device may further include second computing device displaying the message, which may include the calculated arrangement optimizing the expansion devices based on flow control and/or instructions for swapping expansion devices.

The method 500 determines 514 whether the expansion devices have been relocated. In one embodiment, the relocation module 514 determines 514 whether the expansion devices have been relocated. In some embodiments, determining 514 whether the expansion devices been relocated includes storing an identification number for each expansion device coupled to an expansion bus slot (for example, when calculating 510 the arrangement optimizing throughput of the expansion devices), reading, for each expansion bus slot, an identification number of a currently attached expansion device, and comparing the stored identification numbers to the read identification numbers.

In response to determining 514 that the expansion devices have been relocated, the method 500 proceeds to write 516 new flow control data to the plurality of expansion bus registers based on the relocated expansion device. In one embodiment, the register module 208 writes 516 new flow control data to the plurality of expansion bus registers based on the relocated expansion device. Otherwise, in response to determining 514 that the expansion devices have not been relocated, the method 500 may proceed to again prompt 512 the user to relocate the expansion devices. In one embodiment, the relocation module 304 again prompts 512 the user to relocate the expansion devices. Alternatively, the method 500 may continue to monitor for relocation of expansion devices without again prompting 512 the user to relocate expansion devices. The method 500 ends. In one embodiment, the relocation module 304 continues to monitor for relocation of expansion devices without again prompting 512 the user to relocate expansion devices.

In some embodiments, writing 516 the new flow control data includes resetting the plurality of expansion bus registers. In further embodiments, writing 516 the new flow control data includes storing the old flow control data to nonvolatile storage medium (such as flash memory, hard disk drive, or the like) and overwriting data stored in the expansion bus registers with the new data. The old flow control data (stored in nonvolatile storage) may be used at a later point in time to evaluate the calculated arrangement.

Figure 6:
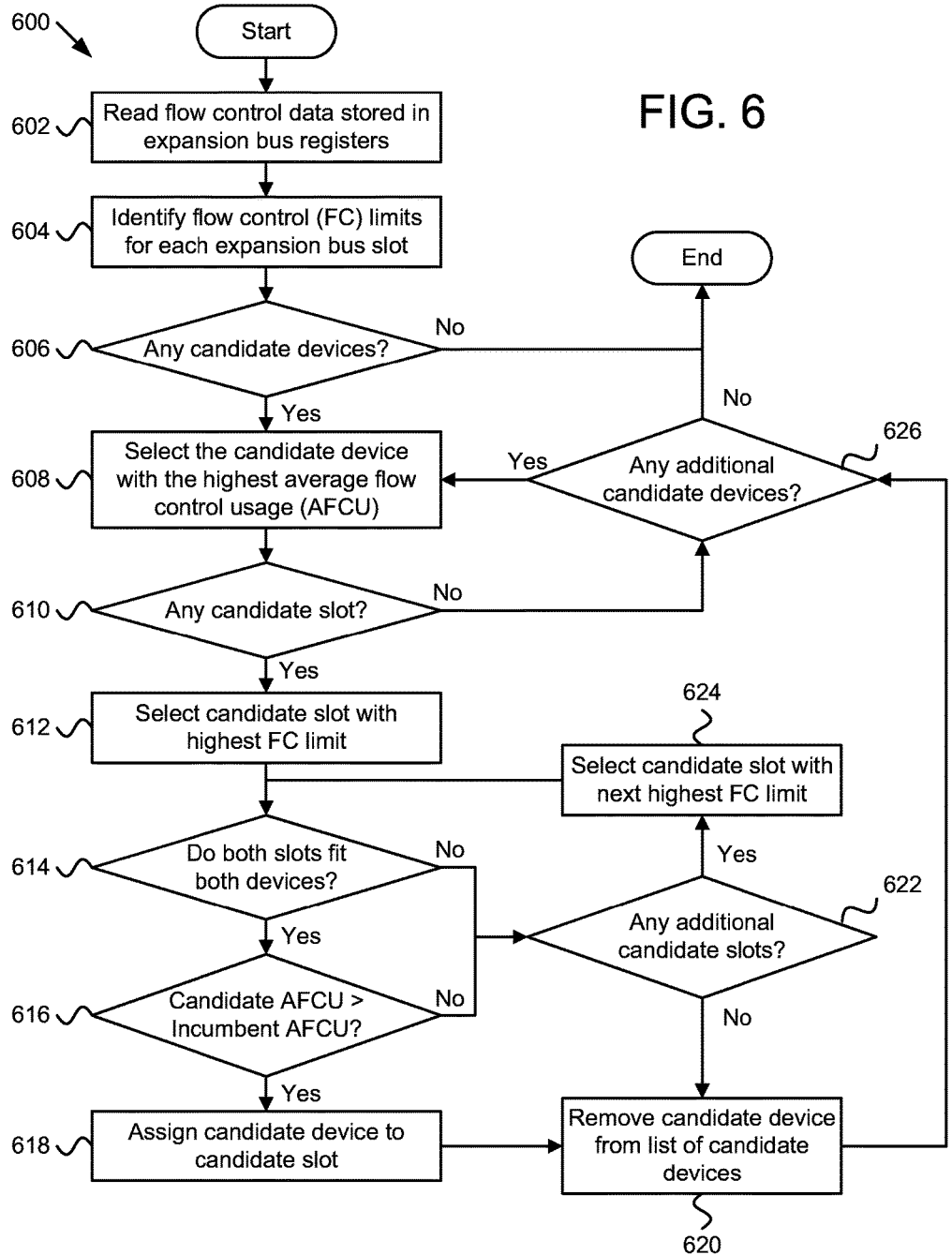
FIG. 6 is a schematic flow chart diagram illustrating one embodiment of a method for calculating an arrangement of the plurality of expansion devices that optimizes throughput based on the flow control data.

FIG. 6 is a schematic flow chart diagram illustrating a method 600 for calculating an arrangement of the plurality of expansion devices that optimizes throughput based on the flow control data, according to embodiments of the disclosure. In some embodiments, the method 600 is performed by a computing device, such as the computing device 101 described above with reference to FIG. 1. In other embodiments, the method 600 may be performed by an apparatus for optimizing expansion devices on a computer expansion bus based on real-time flow control data, such as the flow control data apparatus 200 and/or the flow control data apparatus 300 described above with reference to FIGS. 2-3. In certain embodiments, the method 600 may be performed by a processor executing program code, for example, a microcontroller, a microprocessor, a central processing unit ("CPU"), a graphics processing unit ("GPU"), an auxiliary processing unit, a FPGA, or the like.

The method 600 begins and reads 602 flow control data stored in a plurality of expansion bus registers, such as the expansion bus registers 114. In one embodiment, the slot limit module 310 reads 602 the flow control data stored in a plurality of expansion bus registers. In certain embodiments, the flow control data includes an average flow control usage for each expansion device, a ratio of average flow control usage to flow control limit for each expansion device, and/or an average amount of unused flow control credits for each expansion device. Flow control data may be stored in the expansion bus registers 114 during operation of the computer system, as discussed above.

The method 600 also identifies 604 flow control limits for each expansion bus slot. In one embodiment, the slot limit module 310 identifies 604 flow control limits for each expansion bus slot. In some embodiments, identifying 604 flow control limits includes monitoring for packets sent on the expansion bus announcing an initial flow control limits (e.g., for a link comprising an expansion device and an expansion slot coupling the expansion device to the expansion bus). The initial flow control limits may be stored, for example in the expansion bus registers 114, wherein identifying 604 flow control limits includes reading the flow control limits from the expansion bus registers.

The method 600 determines 606 whether any candidate devices exist based on the flow control data and the flow control limits. In one embodiment, the candidate module 312 determines 606 whether any candidate devices exist based on the flow control data and the flow control limits. For example, determining 606 whether any candidate devices exist may include comparing, for each of the plurality of expansion devices, an average flow control usage to a flow control limit of the expansion bus slot coupled to the expansion device. To be a candidate device, an expansion device may have an average flow control usage that is within a predetermined amount of the expansion bus slot currently coupled to the expansion device. In some embodiments, the predetermined amount is a threshold percentage of the flow control limit (e.g., 90%, 95%, or even 100% of the flow control limit). Alternatively, to be a candidate device, an expansion device may have an average amount of unused flow control credits less than a threshold amount.

In some embodiments, determining 606 whether any candidate devices exist may include accessing a mapping structure storing a current arrangement of the expansion devices and expansion bus slots so as to indicate, within the mapping structure, those expansion devices which qualify as candidate devices. For example, an entry in the mapping structure corresponding to a candidate device may be flagged to indicate that the expansion device is a candidate device.

In response to determining 606 that one or more candidate devices exists, the method 600 selects 608 a candidate device having the highest average flow control usage from among one or more candidate devices. In one embodiment, the candidate module 312 selects 608 a candidate device having the highest average flow control usage from among one or more candidate devices. Otherwise, in response to determining 606 that no candidate devices exist, the method 600 ends. Selecting 608 the candidate device having the highest average flow control usage may include selecting a first candidate device on a list of candidate devices. For example, the priority module 316 may sort a list of the one or more candidate devices according to average flow control usage, wherein the optimization module 302 and/or the candidate module 312 selects the first candidate device on the list.

The method 600 next determines 610 whether any candidate slots exist for the selected candidate device from among the plurality of expansion bus slots. In one embodiment, the candidate module 312 determines 610 whether any candidate slots exist for the selected candidate device from among the plurality of expansion bus slots. In certain embodiments, determining 610 whether any candidate slots exist may include comparing, for each of the plurality of expansion bus slots, a flow control limit to the average flow control usage of the candidate device. Additionally, determining 610 whether any candidate slots exist may include determining whether an expansion bus slot is physically compatible with the selected candidate device. To be a candidate slot, an expansion bus slot must be physically compatible with the candidate expansion device and have a flow control limit larger than the average flow control usage of the selected candidate device.

In response to determining 610 that one or more candidate slots exists for the selected candidate device, the method 600 selects 612 a candidate slot having a highest flow control limit from among the one or more candidate slots. In one embodiment, the placement module 314 selects 612 a candidate slot having a highest flow control limit from among the one or more candidate slots. Otherwise, in response to determining 610 that no candidate slots exist, the method 600 determines 626 whether there are any additional candidate devices among the one or more candidate devices. In one embodiment, the placement module 314 determines 626 whether there are any additional candidate devices among the one or more candidate devices. Selecting 612 the candidate slot with a highest flow control limit, in one embodiment, may include accessing flow control limits for the candidate devices.

The selected candidate device is associated with an incumbent slot. As used herein, an incumbent slot refers to an expansion bus slot currently coupled with the candidate device. In some embodiments, the selected candidate slot may be associated with an incumbent device. As used herein, an incumbent device refers to an expansion device currently coupled with the candidate slot. In other embodiments, the selected candidate slot may be empty.

The method 600 next determines 614 whether both the candidate slot and the incumbent slot are physically capable of coupling to both the candidate device and the incumbent device. In one embodiment, the capability module 318 determines 614 whether both the candidate slot and the incumbent slot are physically capable of coupling to both the candidate device and the incumbent device. Determining 614 whether both slots fit both devices ensures that the method 600 does not generate a physically impossible arrangement.

In response to determining 614 that both slots fit both devices, the method 600 proceeds to determine 616 whether the average flow control usage of the candidate device is greater in value than the average flow control usage of the incumbent device. In one embodiment, the placement module 314 determines 616 whether the average flow control usage of the candidate device is greater in value than the average flow control usage of the incumbent device. In response to the candidate slot being empty, the method 600 also determines 616 whether the average flow control usage of the candidate device is greater in value than the average flow control usage of the incumbent device. Otherwise, in response to determining 614 that both slots do not fit both devices, the method 600 proceeds to determine 622 whether there are any additional candidate slots among the one or more candidate slots (e.g., whether there are any candidate slots not yet considered). In one embodiment, the placement module 314 determines 622 whether there are any additional candidate slots among the one or more candidate slots.

Determining 616 whether the average flow control usage of the candidate device is greater in value than the average flow control usage of the incumbent device may include reading flow data from the expansion bus registers and comparing the average flow control usages for the candidate device and the incumbent device. Determining 616 whether the candidate device's average flow control usage is greater than that of the incumbent device ensures that the method 600 does not generate an arrangement with poorer throughput than the current arrangement.

In response to determining 616 that the candidate device's average flow control usage is greater than that of the incumbent device, the method 600 proceeds to assign 618 the selected candidate device to the selected candidate slot. In one embodiment, the placement module 314 assigns 618 the selected candidate device to the selected candidate slot. In response to the candidate slot being empty, the method 600 also assigns 618 the selected candidate device to the selected candidate slot. Otherwise, in response to determining 616 that the candidate devices average flow control usage is not greater than that of the incumbent device, the method 600 proceeds to determine 622 whether there are any additional candidate slots among the one or more candidate slots. In certain embodiments, the method 600 may assign 618 the selected candidate device to the selected candidate slot in response to the average flow control usage of the candidate device being equal to the average flow control usage of the incumbent device.

Assigning 618 the candidate device to the candidate slot includes assigning the incumbent device to the incumbent slot. While the assignment 618 of the candidate device to the candidate slot is intended as a permanent assignment, the incumbent device may only be temporarily assigned to the incumbent slot. For example, the incumbent device may be later evaluated to be permanently assigned to an expansion bus slot, either to the incumbent slot or to another expansion bus slot.

In response to assigning 618 the candidate device to the candidate slot, the method 600 indicates 620 that the selected candidate device and its assigned expansion bus slot are optimally arranged and determines 626 whether there are any additional candidate devices among the one or more candidate devices. In one embodiment, the placement module 314 indicates 620 that the selected candidate device and its assigned expansion bus slot are optimally arranged and determines 626 whether there are any additional candidate devices among the one or more candidate devices. In some embodiments, the flow control data module 102 maintains a data structure mapping candidate devices and candidate slots, and indicating 620 that the selected candidate device and its assigned expansion bus slot are optimally arranged includes mapping the selected candidate device to its assigned expansion bus slot and flagging the corresponding map entry as optimized. In certain embodiments, indicating 620 that the selected candidate device and its assigned expansion bus slot are optimally arranged prevents the assigned expansion bus slot from later becoming a candidate slot during calculating an arrangement of the plurality of expansion devices.

Determining 622 whether there are any additional candidate slots among the one or more candidate slots, in one embodiment, may include reviewing a list of candidate slots associated with the selected candidate device. In another embodiment, determining 622 whether there are any additional candidate slots among the one or more candidate slots may include indicating the (previously) selected candidate slot as having been considered, for example, by setting a flag or by removing the selected candidate slot from the list of candidate slots.

In response to determining 622 that there is at least one additional candidate slot, the method 600 selects 624 a candidate slot with a next highest flow control limit. In one embodiment, the placement module 314 selects 624 a candidate slot with a next highest flow control limit. Otherwise, in response to determining 622 that there are no more additional candidate slots, the method 600 determines 626 whether there are any additional candidate devices among the one or more candidate devices. In some embodiments, the selected candidate device and its current expansion slot may also be re-assigned to one another and/or be indicated as optimally arranged in response to determining 622 that there are no more additional candidate slots.

Selecting 624 the candidate slot with a next highest flow control limit, in one embodiment, may include accessing flow control limits for the remaining candidate devices. In another embodiment, selecting 624 the candidate slot with a next highest flow control limit may include selecting a remaining candidate slot where only one candidate slot remains to be considered. In response to selecting 624 the candidate slot with a next highest flow control limit, the method 600 again determines 614 whether both the newly selected candidate slot (e.g., the candidate slot with the next highest flow control limit) and the incumbent slot are physically capable of coupling to both the candidate device and an incumbent device (e.g., an expansion device coupled to the newly selected candidate slot).

Determining 626 whether there are any additional candidate devices among the one or more candidate devices, in one embodiment, may include reviewing a list of candidate devices and/or reviewing the mapping structure for expansion devices indicated as candidate devices. In a further embodiment, determining 626 whether there are any additional candidate devices among the one or more candidate devices may include indicating the (previously) selected candidate device as having been considered, for example, by removing a candidacy indication from the mapping structure or by removing the selected candidate device from the list of candidate devices.

In response to determining 626 that there is at least one additional candidate device, the method 600 selects 628 a candidate device with a next highest average flow control usage and again determining 610 candidate slots for the newly selected candidate device, each candidate slot having a flow control limit of greater value than the average flow control usage of the candidate device. Otherwise, in response to determining 626 that there are no more additional candidate devices, the method 600 ends. In some embodiments, the calculated arrangement of the plurality of expansion devices may be output in response to determining 626 that there are no more additional candidate devices.

Figure 7A:
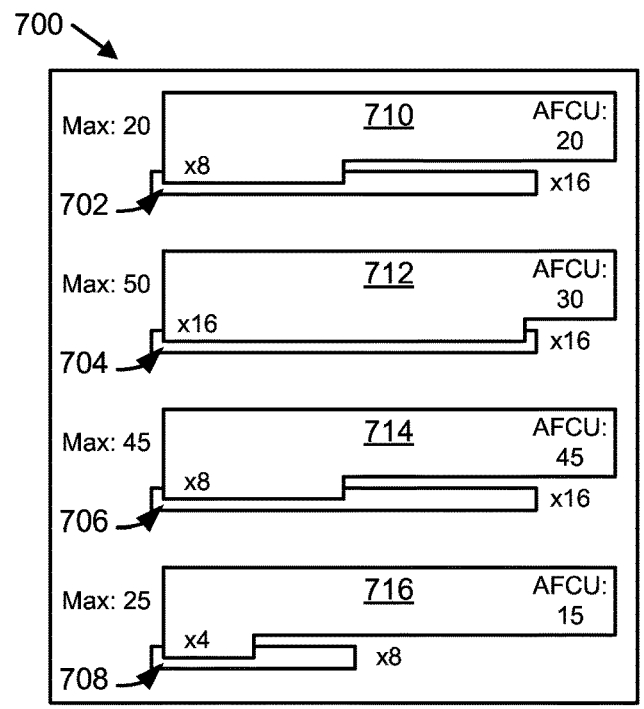
FIG. 7A is a diagram illustrating one embodiment of optimizing expansion devices on a computer expansion bus based on real-time flow control data.
Figure 7B:
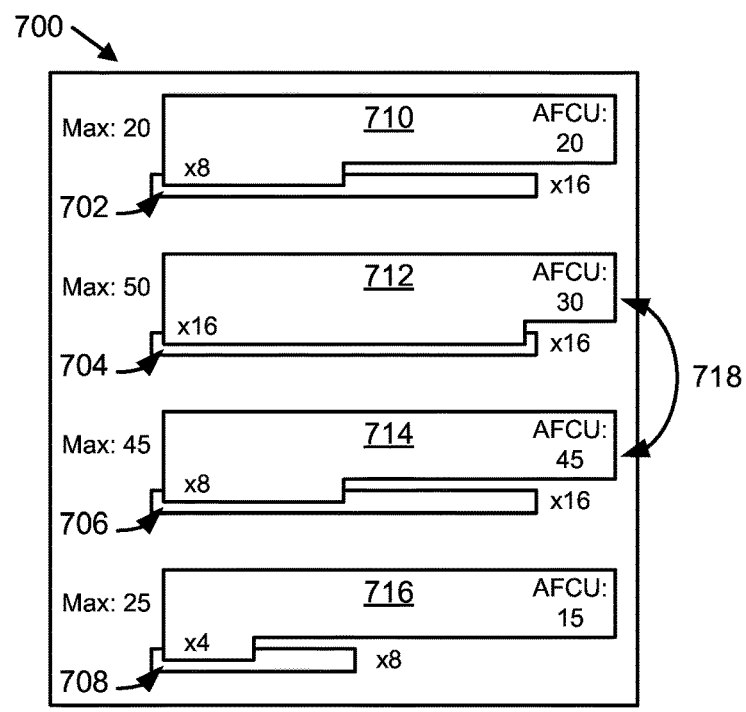
FIG. 7B is a diagram illustrating a first step of optimizing expansion devices on a computer expansion bus based on real-time flow control data.
Figure 7C:
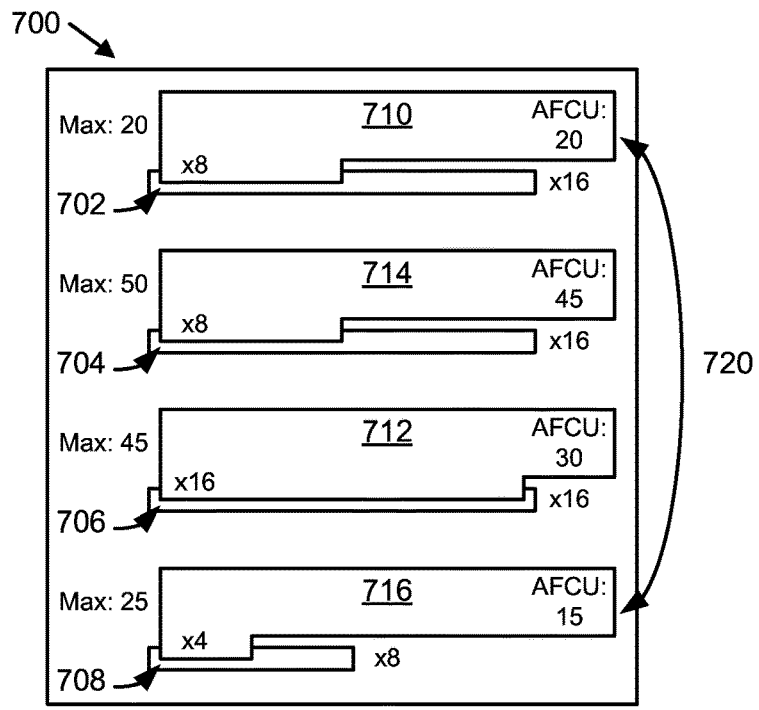
FIG. 7C is a diagram illustrating a second step of optimizing expansion devices on a computer expansion bus based on real-time flow control data.

FIGS. 7A-7C are diagrams illustrating one embodiment of optimizing expansion devices on a computer expansion bus based on real-time flow control data, according to embodiments of the disclosure. FIG. 7A depicts an expansion bus 700 in an initial state. The expansion bus 700 includes a first expansion bus slot 702, a second expansion bus slot 704, a third expansion bus slot 706, and a fourth expansion bus slot 708. Coupled to the expansion bus slot 702-708 are a first expansion device 710, a second expansion device 712, a third expansion device 714, and a fourth expansion device 716. Each expansion bus slots 702-708 are associated with a flow control limit, indicating a maximum number of flow control credits. In the depicted embodiment, the first expansion bus slot 702 has a flow control limit of 20, the second expansion bus slot 704 has a flow control limit of 50, the third expansion bus slot 706 has a flow control limit of 45, and the fourth expansion bus slot 708 has a flow control limit of 25.

A computer system including the expansion bus 700 is run for some duration allowing the expansion devices to use flow control credits. Flow control data is thus generated for each expansion device and stored, for example in a plurality of expansion bus registers. In one embodiment, a flow control data apparatus 200 and/or a flow control data apparatus 300 generates and stores the flow control data, as described above with reference to FIGS. 2 and 3. The apparatuses 200, 300 may be communicatively connected to the expansion bus 700. For example, the expansion bus 700 may reside in the same computer system as the flow control data apparatus 200 or the flow control data apparatus 300. In another embodiment, the flow control data apparatus 200 and/or flow control data apparatus 300 may be integrated with the expansion bus 700.

As shown, each expansion device 710-716 has an average flow control usage, indicating an average number of flow control credits consumed during a particular period of time (e.g., during peak operation). In the depicted embodiment, the first expansion device 710 has an average flow control usage of 20, the second expansion device 712 has an average flow control usage of 45, the third expansion device 714 has an average flow control usage of 30, and the fourth expansion device 716 has an average flow control usage of 15. While the depicted embodiment optimizes the arrangement of expansion devices based on average flow control usage, in other embodiments other metrics may be used to optimize the arrangement of expansion devices, such as a ratio of average flow control usage to flow control limit for each expansion device, an average amount of available flow control credits for each expansion device, and/or a number of times the expansion device reaches the flow control limit.

Each expansion bus slot 702-708 has a physical size. Similarly, each expansion device 710-716 has a physical size. The expansion bus slots 702-708 may couple to expansion devices less than or equal to their physical size. As depicted, the first expansion bus slot 702, the second expansion bus slot 704, and the third expansion bus slot 706 are all physically sized for 16 lanes, while the fourth expansion bus slot 708 is physically sized for eight lanes. Also as depicted, the first expansion device 710 has eight lane connector, the second expansion device 712 has a sixteen lane connector, the third expansion device 714 has an eight lane connector, and the fourth expansion device 716 has a four lane connector.

FIG. 7B depicts expansion bus 700 during a first step of optimizing expansion devices based on real-time flow control data. An optimizing device (not depicted), such as the flow control data module 102, identifies which expansion devices 710-716 are at or near the flow control limit for its associated expansion bus slot 702-708. In some embodiments, the optimizing device determines whether an expansion device 710-716 is within a predetermined percentage of the flow control limit of its associated expansion bus slot 702-708. The expansion devices at or near the flow control limit become candidate devices. As depicted, the first expansion device 710 and the third expansion device 714 are candidates for rearrangement due to their average flow control usage being at the flow control limits of the first expansion bus slot 702 and the third expansion bus slot 706, respectively. In certain embodiments, the optimizing device creates a list of the candidate devices.

The optimizing device identifies the candidate device having the highest average flow control usage. Here the third expansion device 714 has the highest average flow control usage (e.g., 45 vs. 20). Next, the optimizing device determines which other expansion bus slots 702, 704, and 708 have a greater flow control limit than the third expansion bus slot 706. In this case, second expansion bus slot 704 has a greater flow control limit than the third expansion bus slot 706 (e.g., 50 vs. 45). The optimizing device then determines whether the expansion bus slots 704 and 706 are physically compatible with both of the second expansion device 712 and the third expansion device 714. Here, the optimizing device confirms that the expansion bus slot 704, 706 are physically compatible with both of the expansion devices 712, 714 as both expansion bus slots are physically sized for 16 lanes while neither expansion device is larger than 16 lanes. In certain embodiments, the optimizing device may further confirm that the expansion bus slots 704, 706 include sufficient electrical connections for the expansion devices 712, 714.

The optimizing device next determines whether the second expansion device 712 is at the maximum flow control limit for its expansion bus slot (e.g., second expansion bus slot 704) and whether the average flow control usage of the second expansion device 712 is greater than to the average flow control usage of the candidate device (e.g., the third expansion device 714). Here, the answer is no for both determinations and the optimizing device assigns the third expansion device 714 to the second expansion bus slot 704, as indicated by the arrow 718. In certain embodiments, the optimizing device may provide instructions to a user that the second expansion device 712 and the third expansion device 714 should swap places on the expansion bus 700.

FIG. 7C depicts expansion bus 700 during a second step of optimizing expansion devices based on real-time flow control data. In some embodiments, the optimizing device marks the combination of the second expansion bus slot 704 and the third expansion device 714 as optimized, such that the third expansion device 714 cannot be reassigned from the second expansion bus slot 704. The optimizing device identifies the first expansion device 710 as the candidate device having the next highest average flow control usage. In certain embodiments, the optimizing device also removes the third expansion device 714 from the list of candidate devices.

Next, the optimizing device determines which other expansion bus slots 706, 708 have a greater flow control limit than the first expansion bus slot 702. In this case, third expansion bus slot 706 has a greater flow control limit than the first expansion bus slot 702 (e.g., 45 vs. 20). The optimizing device then determines whether the expansion bus slots 702 and 706 are physically compatible with both of the first expansion device 710 and the second expansion device 712. Here, the optimizing device confirms that the expansion bus slot 702, 706 are physically compatible with both of the expansion devices 710, 712 as both expansion bus slots are physically sized for 16 lanes while neither expansion device is larger than 16 lanes. In certain embodiments, the optimizing device may further confirm that the expansion bus slots 702, 706 include sufficient electrical connections for the expansion devices 710, 712.

The optimizing device next determines whether the second expansion device 712 (e.g., the incumbent device) is at the maximum flow control limit for its expansion bus slot (e.g., third expansion bus slot 706) and whether the average flow control usage of the second expansion device 712 is greater than to the average flow control usage of the candidate device (e.g., the first expansion device 710). Here, while the second expansion device 712 is not at the flow control limit of the third expansion bus slot 706, the second expansion device 712 has a greater average flow control usage than the first expansion device 710. Accordingly, the optimizing device does not assign the first expansion device 710 to the third expansion bus slot 706 as this would result in a worse configuration than before due to the second expansion device 712 (having an average flow control usage of 30) being restricted by the flow control limit of the first expansion bus slot 702.

Thus, the optimizing device searches for in other expansion bus slot having a greater flow control limit than the first expansion bus slot 702. In this case, the fourth expansion bus slot 708 has a greater flow control limit than the first expansion bus slot 702 (e.g., 25 vs. 20). The optimizing device then determines whether the expansion bus slots 702 and 708 are physically compatible with both of the first expansion device 710 and the fourth expansion device 716. Here, the optimizing device confirms that the expansion bus slot 702, 708 are physically compatible with both of the expansion devices 710, 716 as the fourth expansion this bus slot 708 is physically sized for eight lanes and neither expansion device requires more than eight lanes. In certain embodiments, the optimizing device may further confirm that the expansion bus slots 702, 708 include sufficient electrical connections for the expansion devices 710, 716.

The optimizing device next determines whether the fourth expansion device 716 (e.g., the incumbent device) is at the maximum flow control limit for its expansion bus slot (e.g., fourth expansion bus slot 708) and whether the average flow control usage of the fourth expansion device 716 is greater than to the average flow control usage of the candidate device (e.g., the first expansion device 710). Here, the answer is no to both determinations. Accordingly, optimizing device assigns the first expansion device 710 to the fourth expansion bus slot 708, as indicated by the arrow 720. In certain embodiments, the optimizing device may provide instructions to a user that first expansion device 710 and the fourth expansion device 716 should swap places on the expansion bus 700.

Figure 7D:
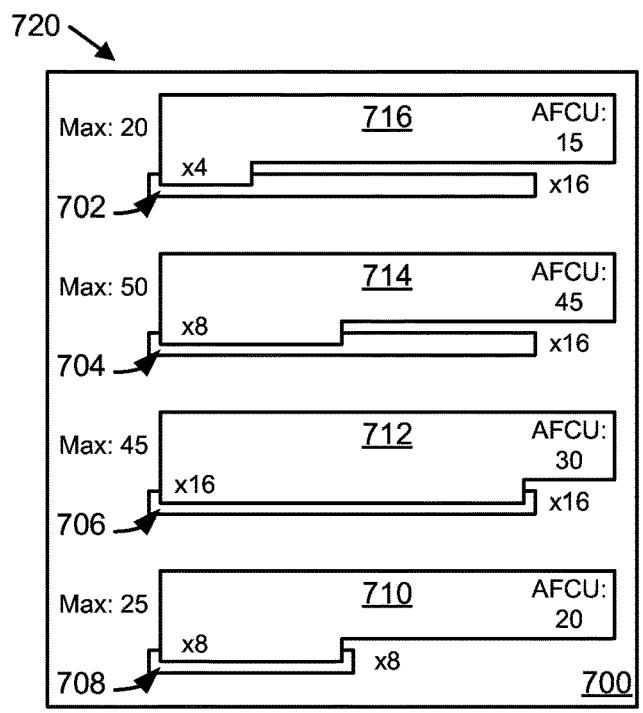
FIG. 7D is a diagram illustrating an embodiment of an arrangement of the plurality of expansion devices that optimizes throughput based on the flow control data.

FIG. 7D depicts a calculated arrangement 720 of the plurality of expansion devices 710-716 on the expansion bus 700. The calculated arrangement 720 is the result of optimizing expansion devices based on real-time flow control data described above, for example in FIGS. 7A-7C. As depicted, the fourth expansion device 716 is placed in the first expansion bus slot 702, the second third expansion device 714 is placed in the second expansion bus slot 704, the second expansion device 712 is placed in the third expansion bus slot 706, and the first expansion device 710 is placed in the fourth expansion bus slot 708. Calculated arrangement 720 maximizes throughput, based on flow control. In some embodiments, the computer system including the expansion bus 700 is run for an additional duration of time, and flow control data relating to the new arrangement of the expansion devices 710-716 is gathered. In further embodiments, the calculated arrangement 720 may be further evaluated based on the new flow control data to verify that the calculated arrangement 720 is an optimal arrangement.

While the embodiments depicted in FIGS. 7A-7D show for expansion devices and for expansion bus slots, in other embodiments the expansion bus 700 may include more expansion devices and more expansion bus slots. Accordingly, where more expansion devices exist, the list of candidate devices may include more expansion devices and the optimizing device may iteratively assign each candidate device to an expansion bus slot, resulting in additional steps of optimizing expansion devices based on real-time flow control data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a configuration module that initializes a plurality of expansion bus registers, each expansion bus register associated with one of a plurality of expansion bus slots;
a packet module that monitors flow control packets on an expansion bus;
a flow control module that calculates, from the flow control packets, flow control data for each of a plurality of expansion devices operating on the expansion bus, each expansion device being received into one of the plurality of expansion bus slots, wherein the flow control module updates the flow control data as new flow control packets are received; and
a register module that writes the flow control data to a corresponding one of the plurality of expansion bus registers, wherein the register module updates the flow control data stored in the plurality of expansion bus registers as additional flow control data is received,
wherein said modules comprise one or more of a hardware circuit, a programmable hardware device, and a processor executing code.

2. The apparatus of claim 1, further comprising an optimization module that calculates an arrangement of the plurality of expansion devices, based on the flow control data, to maximize expansion bus throughput.

3. The apparatus of claim 2, further comprising:
a relocation module that prompts a user to relocate at least one of the plurality of expansion devices into a different expansion bus slot; and
a reset module that deletes data values stored in the plurality of expansion bus registers in response to the at least one expansion device being relocated, wherein the register module writes new flow control data to the plurality of expansion bus registers based on the relocated at least one expansion device.

4. The apparatus of claim 2, wherein optimization module includes:
a slot limit module that identifies flow control limits for each of the plurality of expansion bus slots;
a candidate module that compares, for each of the plurality of expansion bus slots, an average flow control usage for an expansion device using the expansion bus slot to an identified flow control limit for the expansion bus slot, the flow control data including average flow control usage for each of the plurality of expansion devices, wherein the candidate module selects at least one candidate expansion device from the plurality of expansion devices based on the comparison; and
a placement module that assigns each candidate expansion device to one of the plurality of expansion bus slots based on the average flow control usage and the flow control limits.

5. The apparatus of claim 4, further comprising:
a priority module that ranks the at least one candidate expansion device based on highest average flow control usage; and
a compatibility module that compares a physical size of an expansion device to a size supported by an expansion bus slot, wherein the placement module assigns each candidate expansion device to one of the plurality of expansion bus slots based on the size comparison.

6. The apparatus of claim 1, wherein the configuration module further comprises:
an allocation module that identifies an unused expansion bus register for each expansion bus slot and allocates the unused expansion bus registers for storing the flow control data; and
a reset module that deletes data values stored in the allocated expansion bus registers.

7. The apparatus of claim 1, wherein the plurality of expansion bus registers further comprises a plurality of extended capability registers for a peripheral component interconnect express (PCIe) expansion bus, each extended capability register storing the flow control data of one of plurality of expansion bus slots.

8. The apparatus of claim 1, wherein the flow control data comprises one or more of: average flow control usage for each expansion device, a ratio of average flow control usage to flow control limit for each expansion device, and an average amount of unused flow control credits for each expansion device.

9. The apparatus of claim 1, wherein the register module further updates the flow control data stored to the plurality of expansion bus registers in response to the flow control module calculating additional flow control data.

10. A method comprising:
initializing a plurality of expansion bus registers, each expansion bus register associated with one of a plurality of expansion bus slots;
monitoring for flow control packets on an expansion bus;
extracting, from the flow control packets, flow control data for each of a plurality of expansion devices operating on the expansion bus, each expansion device being received into one of the plurality of expansion bus slots, wherein extracting the flow control data comprises updating the flow control data as new flow control packets are received; and
writing the flow control data to a corresponding one of the plurality of expansion bus registers, wherein writing the flow control data comprises updating the flow control data stored in the plurality of expansion bus registers as additional flow control data is received.

11. The method of claim 10, further comprising calculating an arrangement of the plurality of expansion devices that optimizes throughput based on the flow control data, wherein each of the plurality of expansion devices is coupled to one of the plurality of expansion bus slots.

12. The method of claim 11, further comprising:
prompting a user to relocate at least one of the plurality of expansion devices into a different expansion bus slot based on the calculated arrangement of the plurality of expansion devices;
determining that the at least one expansion device is relocated;
resetting the plurality of expansion bus registers storing the flow control data; and
writing new flow control data to the plurality of expansion bus registers based on the relocated at least one expansion device.

13. The method of claim 11, wherein optimizing throughput of the plurality of expansion devices based on the flow control data comprises:
identifying flow control limits for each of the plurality of expansion bus slots;
comparing, for each of the plurality of expansion bus slots, an average flow control usage for an expansion device using the expansion bus slot to an identified flow control limit for the expansion bus slot, the flow control data including average flow control usage for each of the plurality of expansion devices;

determining at least one candidate expansion device from the plurality of expansion devices based on the comparison; and assigning each candidate expansion device to one of the plurality of expansion bus slots based on the average flow control usage and the flow control limits.

14. The method of claim 13, further comprising assigning a priority to each candidate expansion device based on average flow control usage, wherein a candidate expansion device having a highest average flow control usage is assigned a highest priority, wherein assigning each candidate expansion device to one of the plurality of expansion bus slots is further based on the priority of each candidate expansion device.

15. The method of claim 13, wherein assigning each candidate expansion device to one of the plurality of expansion bus slots comprises:

selecting a candidate expansion device having a highest average flow control usage, the selected candidate expansion device being coupled to an incumbent expansion bus slot;

determining at least one candidate expansion bus slot from the plurality of expansion bus slots, each candidate expansion bus slot being physically compatible with the selected candidate expansion device and having a flow control limit larger than the average flow control usage of the selected candidate expansion device;

selecting a candidate expansion bus slot having a highest flow control limit, the selected candidate expansion bus being coupled to an incumbent expansion device;

determining that the incumbent expansion device is physically compatible with the incumbent expansion bus slot; and determining that an average flow control usage of the incumbent expansion device is less than or equal to the average flow control usage of the candidate expansion device.

16. The method of claim 10, wherein initializing the plurality of expansion bus registers further comprises allocating an extended capability register for each expansion bus slot for storing the flow control data.

17. The method of claim 10, wherein initializing the plurality of expansion bus registers further comprises:

identifying an unused expansion bus register for each expansion bus slot;

allocating the identified registers for storing the flow control data; and resetting data values stored in the allocated expansion bus registers.

18. The method of claim 10, wherein extracting flow control data from the flow control packets comprises calculating a number of available flow control credits.

19. The method of claim 10, wherein writing flow control data to the plurality of expansion bus registers comprises, for each of the plurality of expansion bus slots, storing an average flow control usage for an expansion device associated with the expansion bus slot.

20. A program product comprising a computer readable storage medium that is not a transitory signal and that stores code executable by a processor, the executable code comprising code to perform:

initializing a plurality of expansion bus registers, each expansion bus register associated with one of a plurality of expansion bus slots;

detecting flow control packets on an expansion bus;

calculating, from the flow control packets, flow control data for each of a plurality of expansion devices operating on the expansion bus, each expansion device being received into one of the plurality of expansion bus slots, wherein calculating the flow control data comprises updating the flow control data as new flow control packets are received;

storing the flow control data to a corresponding one of the plurality of expansion bus registers based on the flow control packets; and updating the stored flow control data in the plurality of expansion bus registers as additional flow control data is received.

* * * * *